United States Patent [19]

Burrows

[11] Patent Number: 4,584,664

[45] Date of Patent: Apr. 22, 1986

[54] SORTING APPARATUS

[75] Inventor: James L. Burrows, Merrimack, N.H.

[73] Assignee: Sanders Associates, Inc., Nashua, N.H.

[21] Appl. No.: 542,324

[22] Filed: Oct. 17, 1983

[51] Int. Cl.$^4$ ............................................. G06F 7/06
[52] U.S. Cl. ............................................... 364/900
[58] Field of Search ............... 364/900 MS File, 300, 364/200 MS File; 340/146.2

[56] References Cited

U.S. PATENT DOCUMENTS 4,303,989 12/1981 Membrino et al. ................. 364/900

Primary Examiner—Raulfe B. Zache

Attorney, Agent, or Firm—Louis Etlinger; David J. Thibodeau, Jr.

[57] ABSTRACT

Apparatus for sorting two input numbers including a memory that iteratively receives a digit from both of the numbers and transmits output signals corresponding to the input digits, the digits of the larger number being transmitted on one output line and the digits of the smaller number being transmitted onto another output line. The apparatus includes a memory that receives, as address signals, the state signal and signals corresponding to the input digits. The state signal determines the output lines onto which the next pair of input digits are to be transmitted.

19 Claims, 8 Drawing Figures

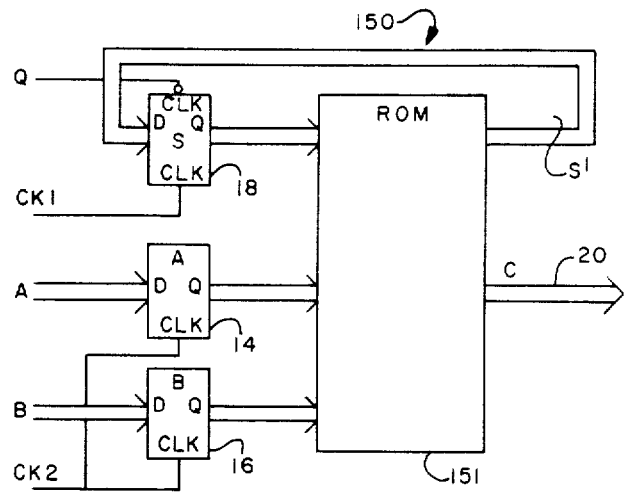
FIG. 6
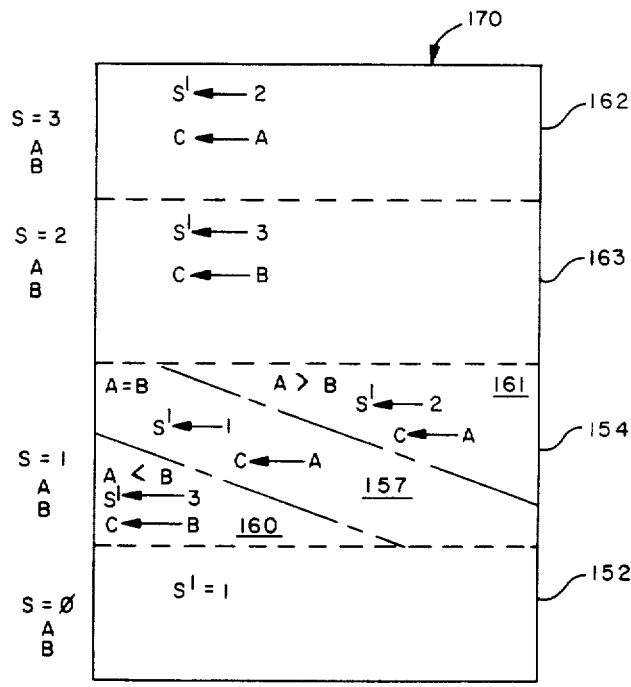
FIG. 6A
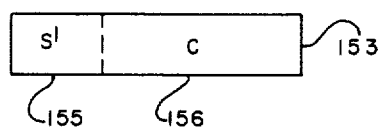

SORTING APPARATUS

BACKGROUND OF THE INVENTION

1. Field of the Invention

The invention relates generally to the field of electronic apparatus for sorting, that is, for receiving numbers in the form of digital signals having numerical values on a plurality of input paths, and for directing them onto predetermined output paths, with the numerical values, or relative values, of the input signals determining the output paths on which they are transmitted onto the output paths, or the order in which they are transmitted onto a single output path. The invention is particularly useful in apparatus which is amenable to construction using very large scale integration techniques.

2. Description of the Prior Art

In many operations in a digital data processing system, it is desirable to sort a plurality of input values to place them in some order, that is, to transmit them onto a particular ordered set of output lines, or to transmit them in order on a single line. Previous sorters have used software sorting techniques which require the intervention of a central processing unit or an auxilliary processing unit dedicated to the sorting process. Software sorting techniques are relatively slow, however, which delays the speedy execution of the program that includes the sorting operation.

Recently, hardware sorters have been devised which take some of the load off of the central or auxilliary processors. However, these hardware sorters generally are also relatively slow.

SUMMARY OF THE INVENTION

The invention therefore aims to provide a new and improved apparatus for quickly sorting numbers input to it in the form of digital signals.

In brief, the invention provides a memory connected to iteratively receive, as a portion of the address signals, signals representing digits of one or more numbers over a like number of input lines, and to transmit output signals corresponding to the input digits on selected output lines. The output lines onto which the output signals are transmitted is governed by a state signal, which constitutes an additional address signal, and which is transmitted by the memory during each iteration. The state signal from each iteration governs the output lines onto which the respective input digits are transmitted during the next iteration.

In particular, one embodiment of the invention comprises a read-only memory that iteratively receives as address inputs two input signals from a pair of input lines and the state signal. Both of the input signals represent digits of numbers in binary-coded-decimal form. The most significant digits of each number (the numbers must have equal numbers of digits, or the number with the lesser number of digits must be padded with leading zeroes so that the number of digits is equal) are first coupled to the address inputs. The output of the memory is connected to a pair of output lines with one output line carrying signals representing digits of the number having a larger numerical value than the other. Each addressable storage location in the memory stores three words, including a "next state" word, and two words storing digits having the numerical values of the input digits that addressed the location, but arranged so that the digits of the larger number are transmitted onto one output line and the digits of the smaller number are transmitted onto the other line. The contents of the next state word of the storage location are then coupled back as the state input portion of the address input of the memory for use in the next iteration.

The next state field identifies the output lines onto which the output signals representative of the input digits are to be transmitted. If the input signals represent input digits having equal numerical values, the signals transmitted on the output lines represent digits equal to each other and to the input digits. However, when the input digits in a pair of numbers first have different numerical values, the memory transmits, as output signals, digits having numerical values equal to the input values, but on the output lines in the appropriate order. The state field thereafter forces the memory to access storage locations so as to transmit the remaining digits in the pair of numbers input thereto onto the proper output lines so that the output line which carries the larger number receives all of the digits of that number, and the line which carries the smaller number receives all of the digits of the smaller number.

BRIEF DESCRIPTION OF THE DRAWINGS

This invention is pointed out with particularity in the appended claims. The above and further objects and advantages of this invention may be better understood by referring to the following description taken in conjunction with the accompanying drawings, in which:

FIGS. 6 and 6A illustrate a further modification of the cell depicted in FIGS. 1 and 2 to facilitate the performance of yet other sorting operations.

DESCRIPTION OF THE PREFERRED EMBODIMENTS

Figure 1:
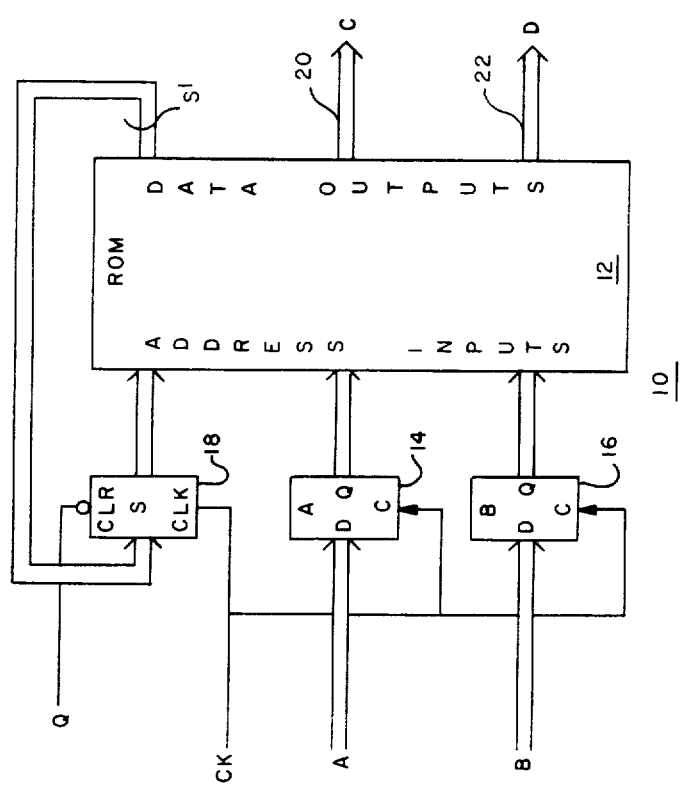
FIG. 1 is a block diagram of a cell which sorts two inputs, and transmits the sorted outputs on two output lines.

FIG. 1 illustrates a cell 10 constructed in accordance with the invention, including a memory 12, preferably a read-only memory (ROM) which receives address signals through a plurality of address inputs indicated from the left, and which transmits data signals through data outputs to the right. Address signals are coupled to the memory's address inputs by three registers 14, 16 and 18, and the data outputs couple data signals onto C and D output lines 20 and 22, respectively.

The signals latched in registers 14 and 16 represent digits of numbers in either binary or binary coded decimal (BCD) form. Specifically, in one embodiment, register 14 iteratively receives, and, at each pulse of a timing signal CK, stores an input signal representing one digit of a number in BCD form on input line A, and register 16 receives and similarly stores an input signal representing a digit of another number in BCD form on input line B. The digits are received and stored starting with the most significant digits, and ending with the least significant digits.

At the address inputs, memory 12 iteratively receives, starting with the most significant digit, the digits of the two numbers from A and B registers 14 and 16. For each pair of digits, the memory transmits onto C and D output lines 20 and 22, signals corresponding to the received digits. The digits that are transmitted onto the C output line 10 correspond to the digits of the larger number, and the digits that are transmitted onto D output line 22 correspond to the digits of the smaller number. Accordingly, the memory 12 iteratively receives the streams of digits constituting pairs of numbers on input lines A and B, through A and B input registers 14 and 16, and transmits output signals onto C and D lines 20 and 22, that represent digits that are numerically equal to the values of the input digits, but that are sorted according to the values of the numbers comprising the digits. The C lines 20 carry the digits of the larger number, and D lines 22 carry the digits of the smaller number.

The state register 18 is provided to enable memory 12 to perform the sorting operation on the number as a whole rather than on each individual digit. This will be illustrated below in connection with FIGS. 2 and 3. The state register is maintained in a cleared condition by the negation of a Q input signal. When the first digit of a number to be sorted is received in A and B registers 14 and 16, the Q signal is asserted, removing the overriding clearing signal from register 18. The Q signal is again negated at the end of the input stream of the pair of numbers, and thus the transitions of the Q signal define the signals representing the most and least significant digits in the numbers being sorted.

Figure 2:
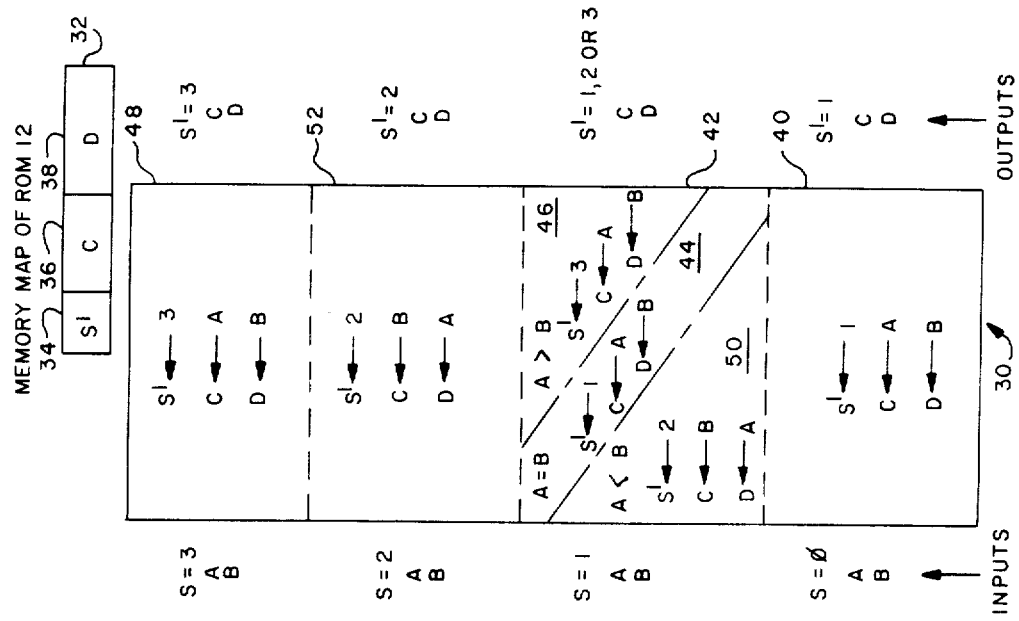
FIG. 2 is a memory map that is useful in understanding the cell depicted in FIG. 1.

FIG. 2 depicts a memory map 30 of memory 12 of the cell 10 depicted in FIG. 1, illustrating the contents of the addressable storage locations in the memory. The most significant address signals coupled to memory 12 are provided by the state register 18, while the less significant address signals are provided by A and B registers 14 and 16.

FIG. 2 also illustrates the contents of a typical storage location 32 in ROM 12. The contents of a storage location 32 having an address (S, A, B) includes three portions, or words. The most significant word 34 constitutes the signals that are transmitted to and latched in register 18 as the next state signals S'. The intermediate word 36 contains bits from which are generated the signals that are coupled onto the C output lines 20. Finally, the least significant word 38 contains bits from which are generated the signals that are coupled on the D output lines 22.

The memory map of memory 12 is divided into four regions 40, 42, 48, and 52, divided according to the address signals provided by state register 18. In region 40, which corresponds to address signals from state register 18 of "zero", all of the storage locations contain next state words 34 containing the value "one". The C word 36 contains bits corresponding to the digit stored in A register 14, and D word 38 contains bits corresponding to the digit stored in B register 16.

The portion of the memory map of memory 12 associated with the address signals from state register 18 equal to "one" is illustrated in region 42. The contents of C and D words 36 and 38 depend not only on the values of the contents of A and B registers 14 and 16, but also on the relative values of the contents of the registers. If the values of the digits stored in registers 14 and 16 are equal, the addressed storage locations in memory 12 have the values depicted in subregion 44. In all of the storage locations in this subregion, next state S' word 34 also contains bits equal to "one", while the bits comprising the C and D words 36 and 38 are equal and correspond to the digits in A and B registers 14 and 16. Accordingly, the signal stored in the state register 18 at the next pulse of timing signal CK will again have the value "one", and the C and D output lines 20 and 22 will both carry output signals that correspond to the input digits from registers 14 and 16, respectively.

If, however, the value of a digit stored in A register 14 is greater than the value of the digit stored in B register 16, the storage location is selected from subregion 46. In all of the storage locations in this region, the bits comprising next state S' words all correspond to the value "three", while the C words 36 contain bits corresponding to the digit stored in A register 14, and the D words contain bits corresponding to the digit stored in B register 16. The signals stored in the C and D words 36 and 38 are then transmitted onto C and D output lines 22 and 20. Simultaneously, signals corresponding to the next state S' word "three" are stored in state register 18.

When the contents of the state register 18 are equal to three, the storage locations 32 are selected from region 48. In all of the storage locations in this region, the next state S' words 34 also contain bits corresponding to the value "three", the C words 36 all contain bits corresponding to the digits stored in the A register 14, and the D words 38 all contain bits corresponding to the digits stored in B register 16. It can be seen that once a memory location has been selected from subregion 46, all subsequent locations will be selected from region 48, until the state register 18 is cleared by the negation of the Q signal. This will be the case even if, for subsequent pairs of digits, a digit received through B register 16 is greater than a digit received through A register 14. Therefore, if the contents of state register 18 equal "one" and a digit in the A register 14 is greater than a digit in the B register 16, all subsequent digits in a number coupled to A register 14 are thereafter transmitted onto C output line 20, and all subsequent digits in a number coupled to B register 16 will be transmitted onto D output line 22. This will occur if the number received through A register 14 is larger than the number received through B register 16. Thus, cell 10 transmits all of the digits in the number received through A register 14 onto C output line 20, which carries the digits of the larger number, and all of the digits in the number received through B register 16 onto D output line 22, which carries the digits of the smaller number.

Returning to region 42, if the contents of state register 18 have the value "one" and if a digit in B register 16 is larger than a digit stored in A register 14, a storage location 32 from a subregion 50 of region 42 will be selected. In this subregion, the next state S' words 34 of all of the storage locations contain bits corresponding to the value "two", the C words 36 contain bits corresponding to the value of the digit stored in B register 16, and the D words 38 contain bits corresponding to the value of the character stored in A register 16. Accordingly, the signals coupled onto C output line 20 correspond to the digit stored in B register 16, and the signals coupled onto the D output line 22 correspond to the digit stored in A register 14.

Therefore, at a next pulse of timing signal CK, the value "2" will be stored in state register 18. The next storage location will be selected from region 52 for the next iteration. In all of the storage locations in region 52, the next state S' words 34 also contain bits corresponding to the value "two", the C words 36 contain bits corresponding to the digits stored in B register 16, and the D words 38 contain bits corresponding to the the digits stored in A register 14. Accordingly, the signals coupled onto C output line 20 correspond to the digit stored in B register 16, and the signals coupled onto D output line 20 correspond to the digit stored in A register 14. For all subsequent digits received by registers 14 and 16, the storage locations are selected from region 52 until the Q signal is negated to clear state register 18. Thus, cell 10 transmits all digits received through B register 16, that is, the digits of the larger number, onto C output lines 20, and digits of the smaller number received through A register 14 onto D output lines 22.

Figure 3:
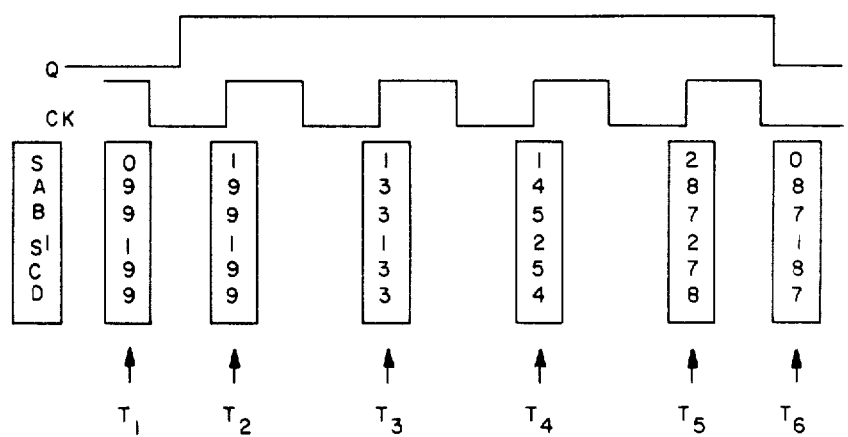
FIG. 3 is a timing diagram illustrating an example that is useful in understanding the cell depicted in FIG. 1.

A specific example will serve to further illustrate the operation of the sorting cell 10 depicted in FIG. 1. With reference to FIG. 3, the number to be received by A register 14 "9348" (decimal), and the number to be received by B register 16 is "9357" (decimal). The numbers are received in binary coded decimal form. One BCD digit from each number is stored in each register for each iteration, that is at each pulse of the CK timing signal. Since the number received through the B register is larger than the number received through the A register, C output lines 20 will carry signals corresponding to the digits of the number received through the B register, and D output lines 22 will carry signals corresponding to the digits of the number received through the B register.

Prior to the assertion of the Q signal, the first digits are loaded into A register 14 and B register 16. The most significant digits are loaded first. At this time (T1), the negated Q signal maintains state register 18 in a cleared condition, so the address signals to memory 12 from state register 18 have the value "zero". Accordingly, the storage locations are selected from region 40, and the C and D output lines 20 and 22 will transmit signals having the values "9" and "9", respectively. The next state S' word has a value equal to "1".

After the Q signal is asserted, removing the overriding clearing signal from register 18, the CK timing signal is asserted at time T2. At this point, signals corresponding to the value of the next state S' field are stored in state register 18. A storage location is thus selected from region 42. Since the most significant digits of the two input numbers "9", are both equal, the storage location is selected from subregion 44. The selected location thus includes a next state S' word 34 equal to "one", and C and D words 36 and 38 both equal to "nine". Thus, signals corresponding to the value "nine" are transmitted onto both C and D lines 20 and 22, and signals corresponding to the value "one" are coupled to the input of state register 18.

When the CK timing signal is next asserted, at time T3, the signals corresponding to the next state S' word 34, "one", are stored in the state register 18. Accordingly, a storage location in region 42 will again be selected during the second iteration. Since the second digits of the input numbers are again equal, both having the value "three", a storage location will again be selected from subregion 44. Accordingly, the value of the next state S' word 34 will again equal "one" and signals from the C and D words 36 and 38, both having the value "three", will again be coupled to C and D output lines 20 and 22, respectively.

When the CK timing signal is asserted for the third iteration, at time T4, the next state register 18 again stores the value "one", indicating that a storage location from region 42 is to again be selected. At this point, however, the value of the digit from B register 16, "five", is larger than the value of the digit from A register 14, "four". Accordingly, the next storage location is selected from subregion 50. The next state S' word 34 contains bits corresponding to the value "two". The contents of the C word 36 correspond to the value "five", which is the value of the digit stored in B register 16. The contents of the D word 38 correspond to the value "4", which is the value stored in the A register 14. Signals corresponding to these words are transmitted onto the C and D lines 20 and 22, respectively.

The next time the CK timing signal is asserted, at time T5, signals having the value "two" are stored in the state register 18, signals having the value "eight" are stored in A register 14, and signals having the value "seven" are stored in B register 16. Accordingly, a storage location is selected from region 52 of memory 12. For this pair of digits, the digit stored in A register 14, "eight", is larger than the value of the digit stored in B register 16, namely "seven". However, in region 52, the contents of the C words 36 are equal to the stored in B register 16, and the contents of D words 36 are equal to the digits stored in A register 16, regardless of the relative values of the digits in the A and B registers at that time. Accordingly, signals corresponding to the value "seven" are coupled onto C lines 20, and signals corresponding to the value "eight" are coupled onto D lines 22.

Thus, when the contents of the state register 18 correspond to the value "one", if a digit received through B register 16 is larger than the value of a digit received through A register 14, signals corresponding to that digit and all subsequent digits received through B register 16 are transmitted onto C output lines 20, and the digits received through A register 20 are transmitted onto D output lines 22. Similarly, when the contents of state register 18 correspond to the value "one", if a digit received through A register 14 is larger than a digit received through B register 16, that digit and all subsequent digits received through register A are transmitted onto C output lines 20, and digits received through B register 16 are transmitted onto D output lines 22.

At time T6, the Q signal is negated, thereby clearing state register 18. The portion of the address input to memory 12 from state register 18 is then equal to "zero", and, if the contents of the A and B registers 14 and 16 are unchanged, a storage location 32 having the signals illustrated in FIG. 3 at time T6 will be selected. The C output lines 20 will transmit signals having a value equal to the value stored in A register 14, namely "eight", and D output line 22 transmits signals having a value equal to the value of the digit stored in B register 16, namely "seven".

In the example depicted in FIG. 3, it is apparent that if the numbers contained more digits, the additional digits would also select storage locations from region 52. When state register 18 once stores the value "two", all subsequent digits received in registers 14 and 16 will address locations in region 52, and the value "two" will remain in state register 18 until it is cleared by the Q signal. Similarly, if a storage location in subregion 46 of region 42 is selected, which occurs if a number received through A register 14 is larger than a number received through B register 16, all subsequent storage locations will be selected from region 48. Accordingly, numbers of any length may be sorted using the cell 10.

Figure 4:
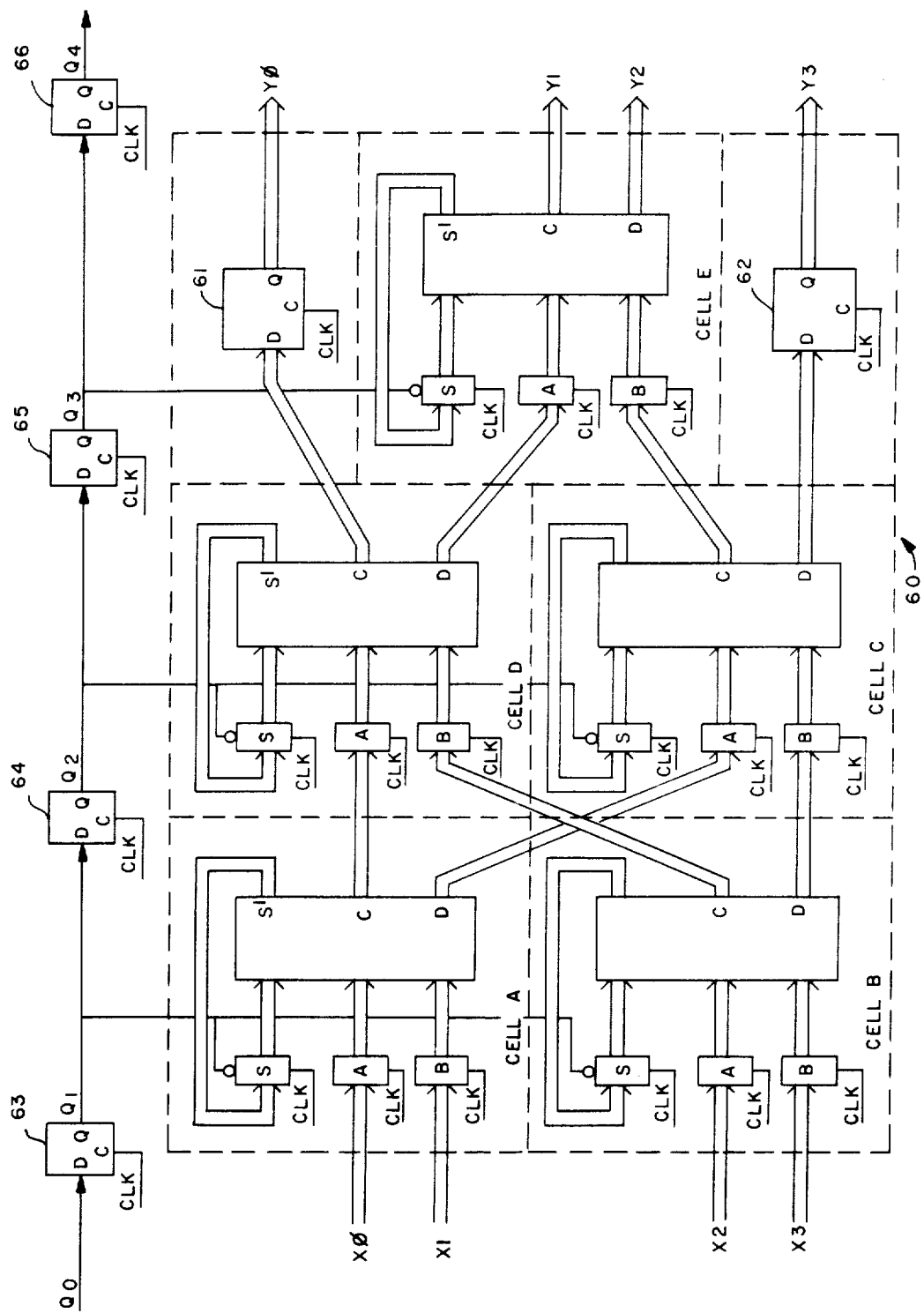
FIG. 4 is a block diagram illustrating a further use of the cell depicted in FIG. 1.

It is evident that cell 10 may be enlarged to sort three or more numbers coupled to it through a like number of input registers. However, with each additional input number, the number of regions required in memory 12 would be increased, so that $(n!+2)$ regions would be required, and $(n!+1)$ subregions would be required for the region corresponding to region 42 in FIG. 2. Accordingly, three numbers would require eight regions, four input numbers would require twenty-six regions, and so forth. FIG. 4 illustrates a sorter 60 in which multiple cells 10 depicted in FIG. 1 are connected to sort more than two numbers. Specifically, sorter 60 sorts four multiple-digit input numbers received on input lines X0 through X3 and transmits them onto output lines Y0 through Y3, with line Y0 receiving signals for the largest number and line Y3 receiving signals for the smallest number. Sorter 60 comprises five cells denominated cell A through cell E. Sorter 60 requires three stages to perform a sort on each digit, and thus will take longer than would a single cell, as the stages are performed sequentially. However, since all of the memories are identical to memory 12, requiring only four regions in their memory maps, the cells are far less complicated to construct.

A first stage sort is performed by cells A and B on pairs of input digits. The cells direct the digits of the larger numbers in each pair to cell D and the digits of the smaller numbers to cell C. Cells C and D then perform the second stage sort. Cell D directs the digits of the largest number to a forwarding register 61, which transmits the digits onto line Y0. Similarly, cell C directs the digits of the smallest number to a forwarding register 62, which transmits the digits onto line Y3. The digits of the intermediate numbers are then directed by cells C and D to cell E where they are sorted in a third stage sort, and coupled onto output lines Y1 and Y2. Forwarding registers 61 and 62 are provided to store digits from the largest and smallest numbers respectively, while the corresponding digits from the intermediate numbers are being sorted in cell E. Thus, the corresponding digits from all of the numbers can be coupled onto the output lines Y0 through Y3 at the same time.

Since sorter 60 requires three stages to perform the sorting operation, each stage is provided with a separate clearing signal Q1, Q2 and Q3, which are provided by latches 63, 64, and 65, respectively. All of these signals are derived from a Q0 signal, and each of the Q1, Q2 and Q3 signals are delayed from the next upstream signal by one clock pulse. The $Q_1$ signal provided by latch 63 is coupled to cells A and B, the $Q_2$ signal is coupled to cells C and D, and the $Q_3$ signal with cell E.

Additional cells and forwarding registers can be added if more than four numbers are required to be sorted. Since additional stages of sorting would be required to accommodate the extra numbers, additional registers, such as register 66, may be required to provide subsequent $Q_n$ signals ("n" being an interger) for those stages.

It should be noted that, after sorting one set of numbers, sorter 60 can sort another set of four numbers by negating the Q0 signal for one clock pulse. This will allow the state registers to be sequentially cleared by the Q1, Q2, and Q3 signals. Sorter 60 need only wait one interval between timing signal pulses before beginning a sort on a next set of input numbers. Thus, at most one timing interval is lost between sets of numbers.

In addition to providing a sorting operation, cell 10 and sorter 60 can be used to direct signals representative of numbers received on input lines A and B (FIG. 1) or input lines X0 through X3 (FIG. 4) onto specific output lines 20 and 22 (FIG. 1) or Y0 through Y3 (FIG. 4) merely by prefixing the numbers with digits having appropriate relative values, so that with the prefixes the numbers will be directed to the desired output lines. For example, if it is desired to transmit the digits of numbers that are input on lines X3, X2, X1 and X0 (FIG. 4) onto output lines Y0, Y1, Y2 and Y3, respectively, this can be accomplished by prefixing the numbers on lines X3 through X0 with characters 4, 3, 2 and 1, respectively. Since the Y0 output line receives the digits of the largest number (including the prefix digit), output line Y0 will receive the digits of the number input on line X3. Similarly, the Y1 output line will receive digits of the number input on the X2 line, the Y2 output line will receive digits of the number input on the X1 line, and the Y3 output line will receive digits of the number input on the X0 line. After the operation has been completed, the prefix digits may be eliminated.

Figure 5A:
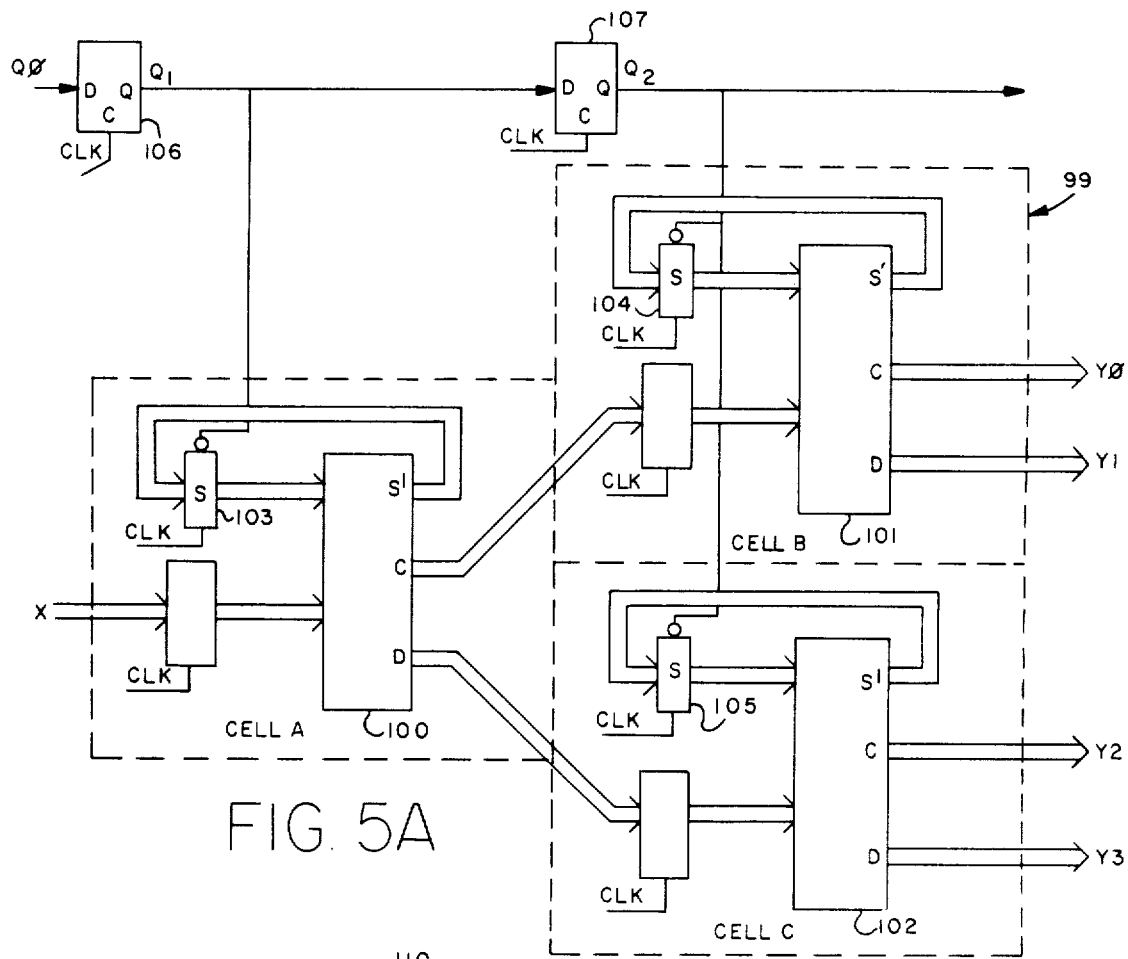
FIGS. 5A and 5B illustrate a modification of the cell depicted in FIGS. 1 and 2 to facilitate the performance of other sorting operations.

FIG. 5A presents an alternative embodiment of a sorter 99 in which signals representing one multiple-digit input number received on an input line X may be directed to one of four output lines Y0 through Y3, depending on the value of its most significant digit. (In this case, as well, an input number may be directed to a specific output line Y0 through Y3 by prefixing it with a digit that identifies the desired output line.) The sorter 99 includes three cells A, B and C, each of which includes a memory 100, 101 and 102, connected in two stages. Memory 100 receives the input number and directs it onto one of two output lines C or D depending on its most significant digit. Similarly, the memory 101 or 102 that receives the number from memory 100 transmits it onto the line Y0 through Y4 indicated by the most significant digit.

Figure 5B:
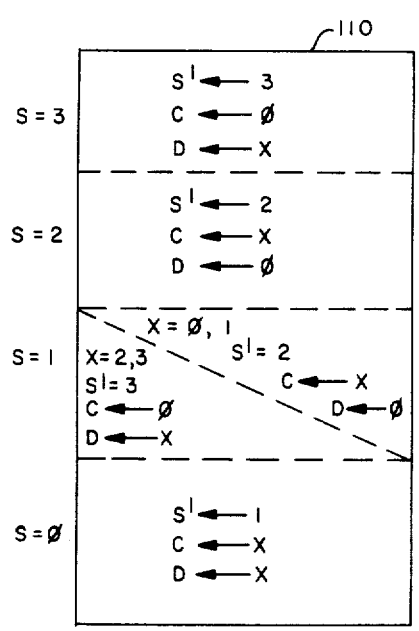
Figure 5B:
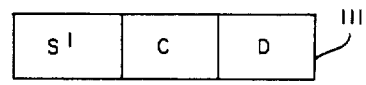

FIG. 5B depicts a memory map 110 of the memory 100 and contents of a typical storage location 111; the memory maps for memories 101 and 102, and contents of typical storage locations in those memories are similar. The primary difference between the memory maps of memories 100, 101 and 102 and the memory map 30 (FIG. 2) of memory 12 (FIG. 1) is that there is no region analogous to subregion 44 (FIG. 2) in the memory maps of the memories 100, 101 and 102. The operation of the individual cells A, B and C is similar to the operation of the cell 10 depicted in FIG. 1. The primary differences in operation are (1) signals representing only one number are coupled to, and transmitted from, the memories 100, 101 and 102, and (2) the next state S' signals will not equal "one" for more than one timing interval, as there is no subregion of memory map 110 (FIG. 5B) analogous to subregion 44. The digits comprising the input number are iteratively received after the Q signal. The Q1 signal produced by latch 106 is delayed by one clock pulse CLK. After each digit is processed by cell A, signals representative of the digit are transmitted to either cell B or C, which, in turn, processes the digits in the same way as does memory 100, after the Q2 signal is asserted by latch 107.

FIGS. 6 and 6A illustrate the use of another variation of cell 10 to multiplex digits of two input numbers from input lines A and B, onto a single output line C. At the output, the digits of the input numbers are interleaved so that each digit of the larger number is transmitted before a digit of the smaller number. The operation of cell 150 is similar to the operation of cell 10, and only the differences will be described. In this case, the frequency of the CK2 timing signal, which is coupled to A and B registers 14 and 16, is one-half of the frequency of the CK1 timing signal coupled to state register 18. The reason for that will be evident from the description of FIG. 6. FIG. 6A depicts a memory map 170 and the contents of a storage location 153 in memory 151. After the Q signal is asserted, removing the overriding clearing signal from state register 18, the next state S' signal is loaded into state register 18 when the CK1 timing signal is next asserted. This signal has the value "one" indicating that a storage location will be selected from region 154 in memory 151. A storage location in memory 151 contains only two words, a next state S' word 155 and a "C" word 156, the contents of which are transmitted as output signals onto C output line 20.

If the values of the digits stored in A register 14 and B register 16 are equal, a storage location of subregion 157 of region 154 will be selected. In this subregion, the next state S' signal has the value "one", and the C field 156 contains the value of the digit in the A register 14 (which in this case is the same as the value of the digit in B register 16). The digit is thus transmitted onto the C output line 20 having the value of the digit in A register 14. When the CK1 timing signal is next asserted, the next state S' signal will be stored in state register 18. Since the CK2 timing signal has not again been asserted, the digits stored in registers 14 and 16 are unchanged. Accordingly, the same location in subregion 157 will be selected.

When the CK1 timing signal is next asserted, the CK2 timing signal will also be asserted. Thus, new digits will be stored in registers 14 and 16. A storage location may again be selected from subregion 157, if the digits in registers 14 and 16 are again equal, or from subregions 160 or 161 if they are not equal. If the contents of the S register 18 have the value "one", and the digit in A register 14 is smaller than the digit in B register 16, a location in subregion 160 will be selected. The C words 156 in storage locations in subregion 160 store digits having the same value as the digits stored in the B register 16, and the S' words 155 all contain the value "3". Thus, when the CK1 timing signal is next asserted (the CK2 timing signal is not then asserted), a location in region 162 is selected. In this region, the C words 153 store a digit having the value of the digit stored in A register 14, which digit is transmitted onto C output line 20. When the CK1 timing signal is next asserted, the CK2 timing signal is also asserted, causing the next pair of digits to be stored in A register 14 and B register 16. At this point, the S register 18 is loaded with the value "two" meaning that a storage location will be selected from region 163.

If the contents of the S register 18 have the value "one", and the digit in A register 14 is first greater than a digit in B register 16, a storage location will be selected from subregion 161, and the next storage location will be selected from region 163. It can be seen that, after the initial digits, the storage locations will be selected so as to alternate between regions 162 and 163, with the order depending on the relative values of the initial digits in the A and B registers. If the initial digits are equal, then the order in which storage locations in regions 162 and 163 are accessed depends on the relative values of the first digits in the registers that are unequal.

As is apparent, cell 150 interleaves digits of the input numbers so that the digits of the larger number always precede corresponding digits of the smaller number. Cell 150 could be constructed so that the digits of the smaller number precede the corresponding digits of the larger number by receiving the C fields in regions 160 and 161. Thus, if the contents of the the C words in region 160 correspond to the digits stored in the A register 14, and if the contents of the C words in region 161 correspond to the digits stored in B register 16, the digits of the smaller number will precede the digits of the larger number.

In summary, several illustrative embodiments of sorting apparatus have been disclosed which receive digits of one or more input numbers and transmits them in specified order onto one or more output lines, the order and line being governed by a state signal generated by the sorting apparatus itself. More specifically, the sorting apparatus includes a memory, and signals representative of the digits constitute address signals. In response to the address signals, the memory transmits output signals corresponding to the input signals over the output lines, as well as a state signal that governs the output lines over which, and the timing during which the next input digits are transmitted. It will be apparent that the specifically disclosed embodiments can be altered while achieving some or all of the advantages of this invention. Therefore, it is the object of the appended claims to cover all such variations as come within the true spirit and scope of the invention.

What is claimed as new and desired to be secured by Letters Patent of the United States is:

1. Apparatus for receiving a plurality of input signals representing input digits from a like plurality of input lines and transmitting signals corresponding to said input digits onto a like plurality of output lines, the particular lines onto which the output signals are transmitted depending on their relative values, said apparatus comprising a memory having a plurality of addressable storage locations, the plurality of input digits together constituting address signals for said memory, each addressable storage location having a like plurality of words each of whose contents are transmitted onto the output lines as the output signals, the contents of said words corresponding to the input digits that address the storage location, the words being arranged in the storage location in order such that, when a storage location is addressed by the input digits, the words are transmitted onto the output lines according to their relative values whereby the input digits are transmitted onto the output lines in sorted order.

2. Apparatus as defined in claim 1 in which each storage location further includes a state word having a value each indicating the relative values of the input words, the memory transmitting state signals corresponding to the contents of said state word on another output line along with the contents of the other words of the addressed storage location, said apparatus further comprising state storage means for storing the state signals.

3. Apparatus as defined in claim 2 in which a sequence of input digits are received on each of said input lines, each sequence having an initial digit and subsequent digits, the subsequent digits comprising an input number, said apparatus transmitting all input digits that it receives on each input line onto the same output line as determined by the initial digit, said state storage means being connected to said memory to provide address signals for said memory, said memory means addressable storage locations being divided into a plurality of regions each associated with one value of said state signals, each of the plurality of words in each of the storage locations in said regions storing digits for transmission onto the output lines in a predetermined order, the addressable storage location identified by the initial digits containing a state word whose value identifies one of said regions, and the state field of all of the storage locations in each of said other regions containing a state word that identifies its region, such that the initial digits identify a storage location which in turn identifies the region from which a next storage location will be selected, and all subsequent digits similarly select storage locations from the same region, whereby all subsequent digits are transmitted onto the same lines as the initial digits.

4. Apparatus as defined in claim 3 wherein said initial digits select storage locations in an initial region in said memory, said state storage means further including means for clearing said state storage means in response to the receipt of a clearing signal, and said input characters thereafter identifying a storage location in said initial region in said memory.

5. Apparatus for receiving an initial digit and an input number comprising a plurality of input digits and for transmitting the number onto one of a plurality of output lines determined by the value of the initial digit, the apparatus comprising a memory having a plurality of addressable storage locations, address inputs for iteratively receiving the input digits as address signals, and data outputs connected to the output lines, and state storage means storing a state signal transmitted by the memory during each iteration, the state signal being coupled to other address inputs to govern the output line onto which the input digits are transmitted.

6. Apparatus as defined in claim 5 in which the addressable storage locations are divided into a plurality of regions each identified by one value of the state signal stored in said state storage means, each storage location also including a state word containing a state signal and a plurality of digit words each associated with one of the output lines, one of the digit words in each storage location storing digit signals corresponding to the input digit that addressed the location, such that in each region a different digit word stores the digit signals, whereby the state signal determines the output line onto which the input digit is transmitted.

7. Apparatus as defined in claim 6 in which one of said regions is an initial region divided into a plurality of subregions, the contents of each state word in each storage location in each subregion storing a state signal whose value depends on the input digit, the digit word in each storage location in each subregion which stores the digit signal corresponding to the input digit depending on the value of the state signals in its subregion, whereby the storage location selected from the initial subregion determines the output line onto which the input digit is transmitted, and the region from which storage locations are selected for subsequent iterations.

8. Apparatus as defined in claim 7 further including means for receiving input digits from a plurality of input numbers, each of which are received as an address input to the memory, the state signals from the initial region depending on the relative values of the digits input to the memory address inputs, and the digit words from the initial region containing the input digits in sorted order such that the digits are transmitted onto selected output lines in sorted order, each of the storage locations of the other regions of the memory storing the input digits in a selected order and the state signals determine onto which lines the subsequent input digits are transmitted.

9. Apparatus for receiving a plurality of input signals representing digits from a plurality of input lines and for transmitting signals corresponding to said input digits onto a like plurality of output lines, the signals being transmitted onto selected output lines, said apparatus comprising means for prefixing each input signal with a prefix signal representing a digit, the relative values of the digits represented by said prefix signals being selected to determine the output lines onto which the signals are to be transmitted, a memory having a plurality of addressable storage locations, the plurality of input digits together constituting address signals for said memory, each addressable storage location having a like plurality of words each of whose contents are transmitted onto one of the output lines as the output signals, the contents of said words corresponding to the input digits that address the storage location, the words being arranged in the storage location in the order such that, when a storage location is addressed by the input digits, the words are transmitted onto the output lines according to their relative values whereby the input digits are transmitted onto the output lines in sorted order.

10. Apparatus as defined in claim 9 further comprising means for stripping the prefix signals from the output signals.

11. Apparatus as defined in claim 9 in which each storage location further includes a state word having a value each indicating the relative values of the input words, the memory transmitting state signals corresponding to the contents of said state word on another output line along with the contents of the other words of the addressed storage location, said apparatus further comprising state storage means for storing the state signals.

12. Apparatus as defined in claim 11 in which a sequence of input digits are received on each of said input lines, each sequence comprising an input number, said apparatus transmitting all input digits that it receives on each input line onto the same output line as determined by an initial character, said state storage means being connected to said memory to provide address signals for said memory, said memory means addressable storage locations being divided into a plurality of regions each associated with one value of said state signals, each of the plurality of words in each of the storage locations in said regions storing digits for transmission onto the output lines in a predetermined order, the addressable storage location identified by the initial characters containing a state word whose value identifies one of said regions, and the state field of all of the storage locations in each of said other regions containing a state word that identifies its region, such that the initial digits identify a storage location which in turn identifies the region from which a next storage location will be selected, and all subsequent digits similarly select storage locations from the same region, whereby all subsequent digits are transmitted onto the same lines as the initial digits.

13. Apparatus as defined in claim 12 wherein said initial digits select storage locations in an initial region in said memory, said state storage means further including means for clearing said state storage means in response to the receipt of a clearing signal, and said input characters thereafter identifying a storage location in said initial region in said memory.

14. Apparatus for receiving a plurality of input signals representing digits from a plurality of input lines and for transmitting signals corresponding to said input digits onto a like plurality of output lines, the signals being transmitted onto selected output lines, said apparatus comprising means for prefixing each input signal with a prefix signal representing a digit, the relative values of the digits represented by said prefix signals being selected to determine the output lines onto which the signals are to be transmitted, a memory having a plurality of addressable storage locations, address inputs for iteratively receiving the input digits as address signals, and data outputs connected to the output lines, and state storage means storing a state signal transmitted by the memory during each iteration, the state signal being coupled to other address inputs to govern the output line onto which the input digits are transmitted.

15. Apparatus as defined in claim 14 further comprising means for stripping the prefix signals from the output signals.

16. Apparatus as defined in claim 14 in which the addressable storage locations are divided into a plurality of regions each identified by one value of the state signal stored in said state storage means, each storage location also including a state word containing a state signal and a plurality of digit words each associated with one of the output lines, one of the digit words in each storage location storing digit signals corresponding to the input digit that addressed the location, such that in each region a different digit word stores the digit signals, whereby the state signal determines the output line onto which the input digit is transmitted.

17. Apparatus as defined in claim 16 in which one of said regions is an initial region divided into a plurality of subregions, the contents of each state word in each storage location in each subregion storing a state signal whose value depends on the input digit, the digit word in each storage location in each subregion which stores the digit signal corresponding to the input digit depending on the value of the state signals in its subregion, whereby the storage location selected from the initial subregion determines the output line onto which the input digit is transmitted, and the region from which storage locations are selected for subsequent iterations.

18. Apparatus as defined in claim 17 further including means for receiving input digits from a plurality of input numbers, each of which are received as an address input to the memory, the state signals from the initial region depending on the relative values of the digits input to the memory address inputs, and the digit words from the initial region containing the input digits in sorted order such that the digits are transmitted onto selected output lines in sorted order, each of the storage locations of the other regions of the memory storing the input digits in a selected order and the state signals determine onto which lines the subsequent input digits are transmitted.

19. Apparatus for receiving a plurality of input signals representing digits from a plurality of input lines and for transmitting signals corresponding to said input digits onto a like plurality of output lines, the signals being transmitted onto selected output lines, said apparatus comprising means for prefixing each input signal with a prefix signal representing a digit, the relative values of the digits represented by said prefix signals being selected to determine the output lines onto which the signals are to be transmitted, sorting means connected to the prefixing means for sorting the input signals, including the prefix signals and transmitting the sorted signals in sorted order, and means connected to receive the sorted signals for removing the prefix signals from the output signal stream and for transmitting the remaining signals onto the output lines in sorted order.

* * * * *